United States Patent [19]
Wenthe, Jr.

[11] Patent Number: 5,978,622
[45] Date of Patent: Nov. 2, 1999

[54] MOVING DOCUMENT IMAGING SYSTEM WITH RETARD SEPARATOR WEAR DEBRIS ATTRACTANT SHIELD SYSTEM

[75] Inventor: Stephen J. Wenthe, Jr., West Henrietta, N.Y.

[73] Assignee: Xerox Corporation, Stamford, Conn.

[21] Appl. No.: 09/191,357

[22] Filed: Nov. 13, 1998

[51] Int. Cl.[6] .................................................. G03G 21/00
[52] U.S. Cl. ........................... 399/98; 15/1.51; 271/121; 271/167; 399/367
[58] Field of Search .............................. 399/98, 365, 367, 399/373–4; 15/1.51; 271/104, 121, 137, 167; 355/30

[56] References Cited

U.S. PATENT DOCUMENTS

| | | | |
|---|---|---|---|
| 4,750,018 | 6/1988 | Gooray et al. | 399/390 |
| 5,435,538 | 7/1995 | Billings et al. | 271/34 |
| 5,534,989 | 7/1996 | Rubscha et al. | 399/381 |
| 5,717,505 | 2/1998 | Chang et al. | 399/98 |

*Primary Examiner*—Arthur T. Grimley
*Assistant Examiner*—William A. Noë

[57] ABSTRACT

In a moving documents imaging system in which documents are separated and sequentially fed from a stack thereof to an imaging platen surface by a separator-feeder system comprising an elastomeric document feeding roller and a frictionally engaging retard member producing elastomeric wear particles optically contaminating the imaging platen surface, an electrostatically attractive shield member is closely spaced from and closely partially surrounding the elastomeric document feeding roller surface to attract and retain these elastomeric wear particles to the interior surface of the shield member so that these particles are not transported by documents to the imaging surface and may be removed by removal of the shield or the entire separator-feeder system. The same shield member may extend to be additionally closely spaced around an elastomeric nudger wheel upstream of the sheet feeding roller. The system may further include a simple triboelectric charging member engaging the document feeding roller surface.

6 Claims, 4 Drawing Sheets

MOVING DOCUMENT IMAGING SYSTEM WITH RETARD SEPARATOR WEAR DEBRIS ATTRACTANT SHIELD SYSTEM

Disclosed in the embodiments herein is an improved moving document imaging system with a frictional retard nip type of document sheets separating and feeding system for sequentially feeding document sheets for imaging at an imaging station with an imaging platen, in which optical contamination of the imaging platen by wear particles from the retard separator is substantially reduced by a closely adjacent and partially surrounding electrostatically attractive shield system which attracts those wear particles thereto so that those wear particles will not be carried on the image surface of the document sheets to the imaging platen to contaminate, streak or damage said imaging platen.

Contamination of the imaging platen of a document reproduction system, such as the scanner for digital imaging of original documents, copiers, printers, multi-function or other reproduction systems, is particularly acute in moving document imaging systems. These are commonly called constant velocity transport (CVT) or slit scan type document imaging systems. In such document imaging systems the documents are typically scanned by the digital or optical imaging member by being carried across, and held against, a narrow area of a glass platen at a constant velocity and imaged through that narrow glass platen area. Examples of such CVT document imaging systems are disclosed in the Xerox Corporation U.S. patents cited below, and various other CVT references cited therein. The movement of large numbers of documents over the same small (almost line) area of the platen glass has presented a long-standing problem in optical contamination and wear of that area of the glass surface.

The use of a retard type frictional sheet separator and feeder upstream of the imaging platen has been found to aggravate that problem of contamination of the imaging platen glass, even interfering with accurate imaging of parts of the document and/or causing streaks on the reproductions made from the imaged documents. Retard type separator feeders typically have a frictional retard nip of elastomeric material, and inherently tend to have wear with usage of the elastomeric material on the surface of either or both the feed wheel(s) and the mating retard pad or wheel, since they are in relative frictional movement with one another during the separating-feeding cycles of the document sheets being fed from the input stack of documents. There can be direct frictional engagement between the feed member and the retard member for part of the feed cycle, as well as frictional movement and engagement by both members of intervening document sheets being separated in the retard nip defined therebetween. This ablated elastomeric material from the surface of the feed wheel or wheels and the retard wheel or pad member tends to be placed on or even pressed into the original document sheets being fed downstream to the imaging platen. In some cases this attraction to the document image surface may be increased by electrostatic and/or van der Waal forces.

The present system provides a simple, low-cost, yet effective, means of overcoming these and other problems by attracting and accumulating these elastomeric wear particles from the frictional sheet retard/separator nip system with a closely adjacent and partly surrounding plastic shield member. Thus, the amount of such undesirable elastomeric wear material transported to the imaging platen may be substantially reduced, substantially reducing the tendency for smearing or other interference with the optical clarity of the imaging platen for imaging the documents therethrough.

Further by way of background, Xerox Corporation U.S. Pat. No. 4,750,018 issued Jun. 7, 1998 to Arthur M. Gooray, et al., addresses another debris contaminant problem, in reproduction machines, of the removing of paper debris from the surfaces of copy sheets facing the imaging member before the copy sheets reach the transfer station, as particularly explained in column 5, line 25, through column 6, line 59. Copy sheets there are being driven between a nip comprising a drive roll and a dielectric roll which is being electrostatically charged by engagement with the drive roll. That dielectric roll is being cleaned by a brush, blade or other cleaning member. Of interest to one of the embodiments herein, column 5, lines 57–61, notes that as an alternative for charging the dielectric idler roll, the engaging brush could be made of highly conductive material such as metal or carbon filled fiber and biased so that it brush-charges the dielectric roll.

One of the most difficult problems in feeding sheets, including original documents sheets being fed to be imaged and the image stored and/or printed, as here, is separating and feeding the sheets sequentially, only one at a time, at the desired time, from a stack of sheets. That is, to avoid "double feeds", sheet overlaps, nonfeeds, or other misfeeds. Sheets can vary widely in size and weight, stiffness, age, humidity, curl, size and other properties complicating the separation and feeding at the proper time of only one sheet at a time.

Some general examples of prior patents on retard-type spring reverse driven retard roller sheet separator-feeders are disclosed in U.S. Pat. Nos. 4,368,881 to Savin; and 5,039,080 to Konika. Other retard systems, with driven reverse rotation of retard rollers, instead of springs, are disclosed in U.S. Pat. Nos. 3,108,801, 2,979,330 and 4,801,134. Other retard sheet separators, and general principles thereof, including fixed retard pad systems, are described in Xerox Corporation U.S. Pat. No. 3,768,803 issued Oct. 30, 1993 to Klaus K. Stange.

Of particular interest to the specific semi-active retard separator-feeder of the specific embodiment herein are Xerox Corporation U.S. Pat. Nos. 5,435,538 issued Jul. 25, 1995 to Philip A. Billings and Ermanno C. Petocchi; 5,421,569 issued Jun. 6, 1995 to Harry A. Davidson; 5,709,380 issued Jan. 20, 1998 to Ermanno C. Petocchi and Bruce J. DiRenzo; and 5,769,410 issued Jun. 23, 1998 to Harry A. Davidson and Donald J. Lyon; and other patents cited therein. The U.S. Pat. No. 5,435,538 teaches details of a frictional elastomer retard roller with an integral wrap spring slip biasing device to retard and separate underlying sheets while the top sheet is being fed out by a driven frictional elastomer feed wheel forming the retard nip by a normal force engagement of the retard roll against the feed roll. The retard roll is allowed to slip rotate in the downstream or forward sheet feeding direction, driven by the rotation of the feed roll, once the predetermined torque drag level is exceeded (in contrast to a fixed retard pad or roller). The rotational torque drag of the retard roll is set to provide considerable resistance to rotation, so that if two or more sheets are in the retard nip, normally only the one sheet engaged by the feed roll will be driven downstream out of the retard nip, and the others will be retarded there. The respective surface slippages in such retard feeders produces wearing away of elastomer particles from the respective surfaces, as previously discussed.

Further by way of background, in sheet feeder-separator systems, including retard types, the single sheet being fed forward or downstream (while the other sheets are being retarded) is typically fed downstream to a "take-away" rolls nip located less than one sheet dimension downstream. The take-away nip positively engages and pulls the fed sheet on downstream, and may pull the rest of that sheet out of the retard nip (which is typically a less positive sheet engagement system with potential or actual slip, and overdriven or under-driven as compared to the take-away rollers). This can induce additional drag and wear on the retard nip components outer surfaces. Additionally, an upstream intermittently engaged elastomeric frictional nudger wheel, as also shown in those references, may also engage and deposit wear particles on the surface of the document sheet to be fed downstream and imaged over a platen imaging area.

As shown in the exemplary embodiments, the retard separator-feeder embodiment further described herein is utilized in a document feeder for reliably separating and sequentially feeding a variety of original document sheets to be scanned sequentially in an electronic image scanner. The embodiment here corresponds closely in that regard to the document handler of Xerox Corporation U.S. Pat. Nos. 5,534,989 issued Jul. 9, 1996 to Robert F. Rubscha et al.; 5,461,468 issued Oct. 24, 1995 to Neil J. Dempsey et al.; and 5,339,139 issued Aug. 20, 1994 to Jack K. Fullerton, et al; but this invention is not limited to that particular application.

The same elastomeric particle contamination of the imaging platen problem could occur even if there was a fixed retard roll or pad. However, even in the exemplary system, where the retard roll is being rotated forward, it is only with high resistance, as the fed sheet is fed out of the retard nip (first by the feed roll and then by the downstream take-away rolls). The feed rolls must pull against and overcome the drag force set in the retard roller, which may be provided by an internal wrap spring as in the above-cited U.S. Pat. No. 5,435,538. This drag resistance of the retard roll may be considerable, e.g., 39 Newton-millimeters of torque.

In the description herein the term "document" or "sheet" refers to various flimsy physical sheets of paper, plastic, or other suitable physical image substrates.

A specific feature of the specific embodiment disclosed herein is to provide in a moving documents imaging system in which the documents are separated and sequentially fed from a stack thereof to an imaging platen subject to contamination for an image side of said documents to be imaged by a sheet retard separator-feeder system, said sheet separator-feeder system including a rotatably driven frictional elastomeric surface sheet feeding member and an elastomeric surface sheet movement resisting frictional retard member engaging said sheet feeding member to form a sheet retard nip for retarding documents other than a document being fed by said sheet feeding member, wherein one of sheet feeding member or said retard member engages said image side of said documents to define an elastomeric document image surface engaging retard member surface, and wherein said elastomeric surfaces produce elastomeric wear particles in said separating and sequentially feeding said documents which can contaminate said imaging platen, the improvement comprising: an electrostatically attractive shield member with an interior surface closely spaced from and closely partially surrounding said elastomeric document image surface engaging retard member surface to attract and retain said elastomeric wear particles to said interior surface of said electrostatically attractive shield member.

Further specific features disclosed herein, individually or in combination, include those wherein said sheet retard separator-feeder system further includes an elastomeric surface nudger wheel engaging said image side of said documents upstream of said sheet feeding member, and wherein said electrostatically attractive shield member is additionally closely spaced from and closely partially surrounds said elastomeric surface nudger wheel; and/or further including a triboelectric charging member engaging said elastomeric document image surface engaging retard member surface; and/or further including a triboelectric charging member engaging said elastomeric document image surface engaging retard member surface; and/or wherein said elastomeric document image surface engaging retard member surface is said rotatably driven frictional elastomeric surface sheet feeding member; and/or wherein said elastomeric document image surface engaging retard member surface is said rotatably driven frictional elastomeric surface sheet feeding member, and said sheet feeding member is generally cylindrical, and wherein said shield member interior surface is correspondingly generally cylindrical and surrounds more than 90 degrees of said elastomeric surface of said sheet feeding member.

As to specific components of the subject apparatus, or alternatives thereof, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation shown and described in the examples below, and from the abstract and claims. Thus, the present invention will be better understood from this description of specific exemplary embodiments, including the drawing figures (approximately to scale) wherein:

FIG. 1 illustrates one example of a constant velocity transport document imaging system in which documents are separated and fed by one example of a retard sheet separator/feeder to a narrow slit scanning station of an imaging platen, showing a first embodiment of the subject retard feeder elastomer wear particles attraction system comprising a closely partially surrounding shield of non-conductive plastic material;

Figure 1:
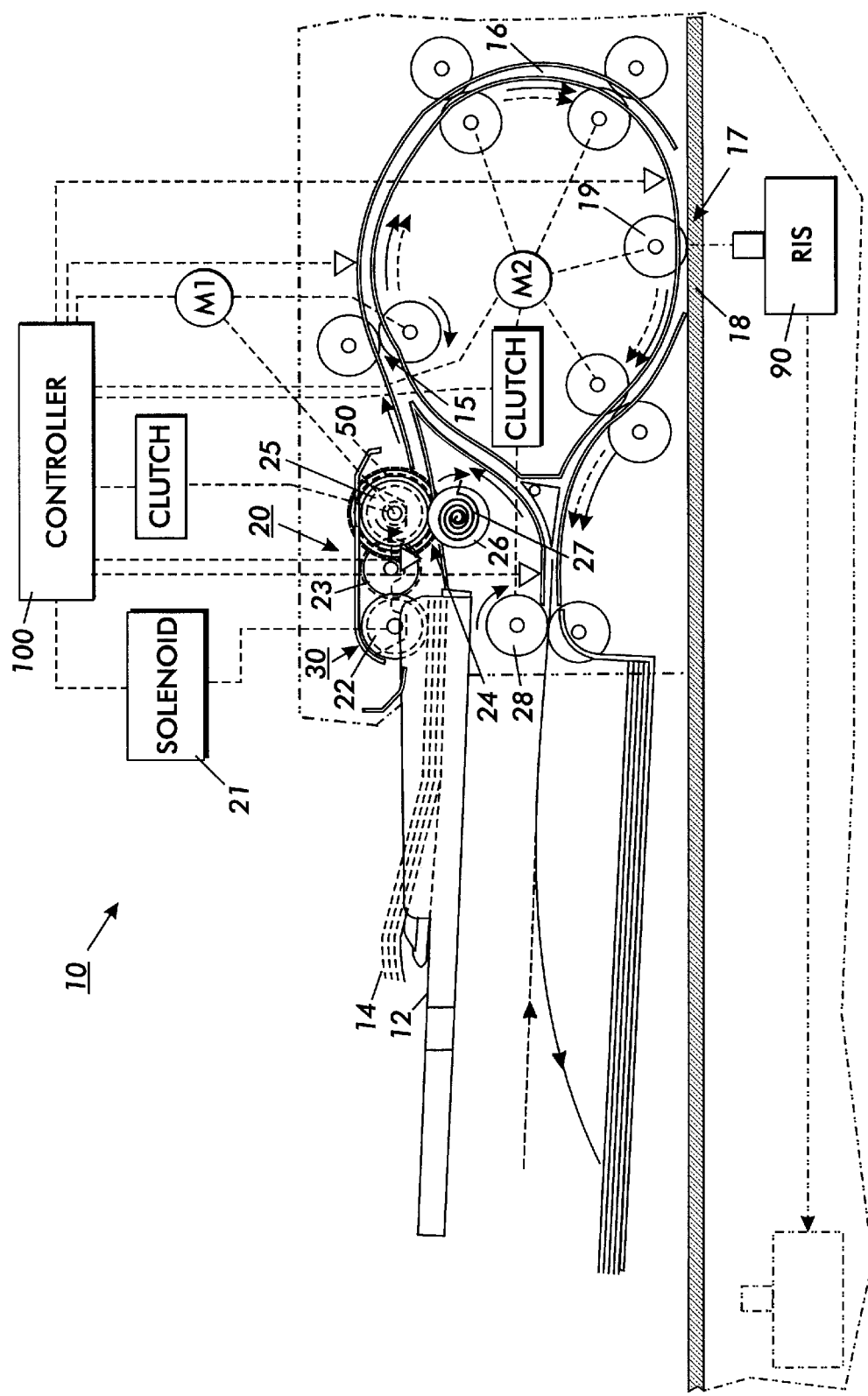

Referring first in general to both of the embodiments of FIGS. 1–4, as noted above, document handlers for a moving document imaging system with an active or semi-active retard type document feeder/separator have a particular problem in the generation of wear debris from the abrasion of the elastomer retard feeder and nudger rollers (tires) during sheet feeding. This wear debris in previous systems gets onto the image side of the document and is carried to the CVT imaging platen where it can cause image streaks. This steady generation of contaminants and their transmission with documents to the platen can render even frequent glass cleaning of the platen glass ineffective in fully eliminating such streaks because of their continuous re-supply with additional documents being fed to be imaged.

The disclosed system collects most of this wear debris adjacent to its source so that it is not transported to the platen. It was observed that these elastomeric wear particles have a particular affinity for (are attracted to) an appropriately designed frame or enclosure of the retard sheet separator, apparently due to static attraction, even under humid conditions. By appropriate design, here a partially surrounding and closely adjacent plastic shield, it has been found that this static attraction, and retention, of the retard member wear material on the interior surface of the shield can be sufficient to greatly reduce, if not eliminate the wear debris transported to the platen.

As an additional disclosed feature, it has been found that this electrostatic attraction can be further enhanced by the addition of a cantilevered or spring-loaded flap that is biased against the feed roll of the retard feeder/separator to enhance generation of a triboelectric charge to assist in attracting the wear debris to the shield collection surfaces. The flap material can also be selected to optimize the electrostatic charging characteristics so as to also collect loose toner which may be on the original documents.

The attractive surrounding shield surfaces to which the wear particles are attracted and retained (possibly by van der Waal surface attraction as well as electrostatics) may be periodically cleaned during the regular routine cleaning of other components of the reproduction apparatus. Additionally, or alternatively, as taught in above-cited references, the entire retard feeder separator wheel or tire set which is subject to wear may be a removeable and replaceable modular unit. When it is removed, the shield containing the wear contaminants may be removed with it, separately or as part of that periodically removed, replaced and disposed of retard separator/feeder module.

The wear particles from the retard separator/feeder members which deposit on the image side of the document sheet are a particular problem. That is, the side of the document sheet being fed to and fed across the imaging platen surface. Typically in a CVT imaging system, that side of the document is pressed down against the platen glass by a backing roller and/or baffle as the document is moved across that glass surface, in order to maintain a constant distance or depth of field of the document from the imaging system, as well as a constant velocity in that narrow imaging area. That presses the wear particles on the document against the glass in that same narrow area across the platen glass. Although in the disclosed embodiment it is the feed roller(s) that are on top and engage and tend to deposit wear particles on that imaging side of the document, there are other, e.g., bottom sheet stack feeder-separators, in which the retard roller or pad is the member engaging the imaging surface instead of the feed roller(s), which are on the other side of the retard nip in such other systems. Hence the term "imaging surface engaging member" as used herein is intended to cover either situation. It is the imaging surface engaging member of the retard nip forming system from which it is most important to remove wear particles, to prevent them from being pressed against and across the surface of the platen glass in the imaging station or slit.

As disclosed herein, it has been found that by providing an electrostatically attractive shield of insulative plastic closely spaced from, and partially surrounding the imaging surface engaging member of the retard nip system, that wear particles can be attracted away from the imaging surface engaging member to the facing, interior, surface of the shield, before and instead of depositing on imaging surface side of the document being fed out of the retard nip towards the imaging station. The spacing between the particle-attractive shield and the imaging surface engaging member is preferably a small fraction of the radius or other dimension of the imaging surface engaging member.

In both illustrated embodiments, the overall document handler 10 (more fully described in the above-cited patents thereon) has a document sheet stacking input tray 12 in which the document sheets to be imaged are stacked. The top sheets 14 from the sheets stacked in that tray 12 are sequentially fed from the tray 12 with a semi-active retard type sheet separator-feeder system 20 driven by a motor M1 and conventionally controlled by a controller 100. Briefly, in this exemplary separator-feeder system 20, a sheet 14 is separated from its underlying sheets, first by intermittent engagement (actuated by a solenoid 21) of the top sheet by a nudger roll 22 (driven by gear 23 driven off the drive of the feed roller 25). Overlapping sheets are then separated in a retard nip 24. The retard nip 24 here is defined by an underlying retard (drag) roller 26 engaged by an intermittently driven feed roller 25. The sheet 14 is then fed downstream by the feed roller 25 driven by a drive system 50 connection to motor M1, via the clutch schematically indicated in FIGS. 1 and 2, to a driven takeaway roller nip 15 (which may also have a sheet acquisition sensor). The retard roller 26 may be torque biased for retarding sheets by an internal drag wrap spring 27. The retard system 20 here has a removable snap-in unit comprising the retard roller 26 and the feed roller 25, as further disclosed in the above-cited patents thereon—U.S. Pat. Nos. 5,421,569, 5,709,380 and 5,769,410. The document sheet 14 that has been separated and fed out is fed downstream in a document feeding and inverting loop path 16 to the imaging station 17 which is a small area of the upper surface of the stationary platen glass 18, against which the moving document 14 is held down by a roller 19, while the document is being sequentially imaged through the platen glass 18 by the imager, here the "RIS" (raster input scanner) 90. After scanning, the document may be ejected by exit rolls 28 into the illustrated output tray or, if it is a duplex document, inverted and refed back through path 16 with the clutch shown connecting M2 to reverse the exit rolls 28 for imaging its second side, as explained in detail in the above-cited patents on that feature.

Figure 2:
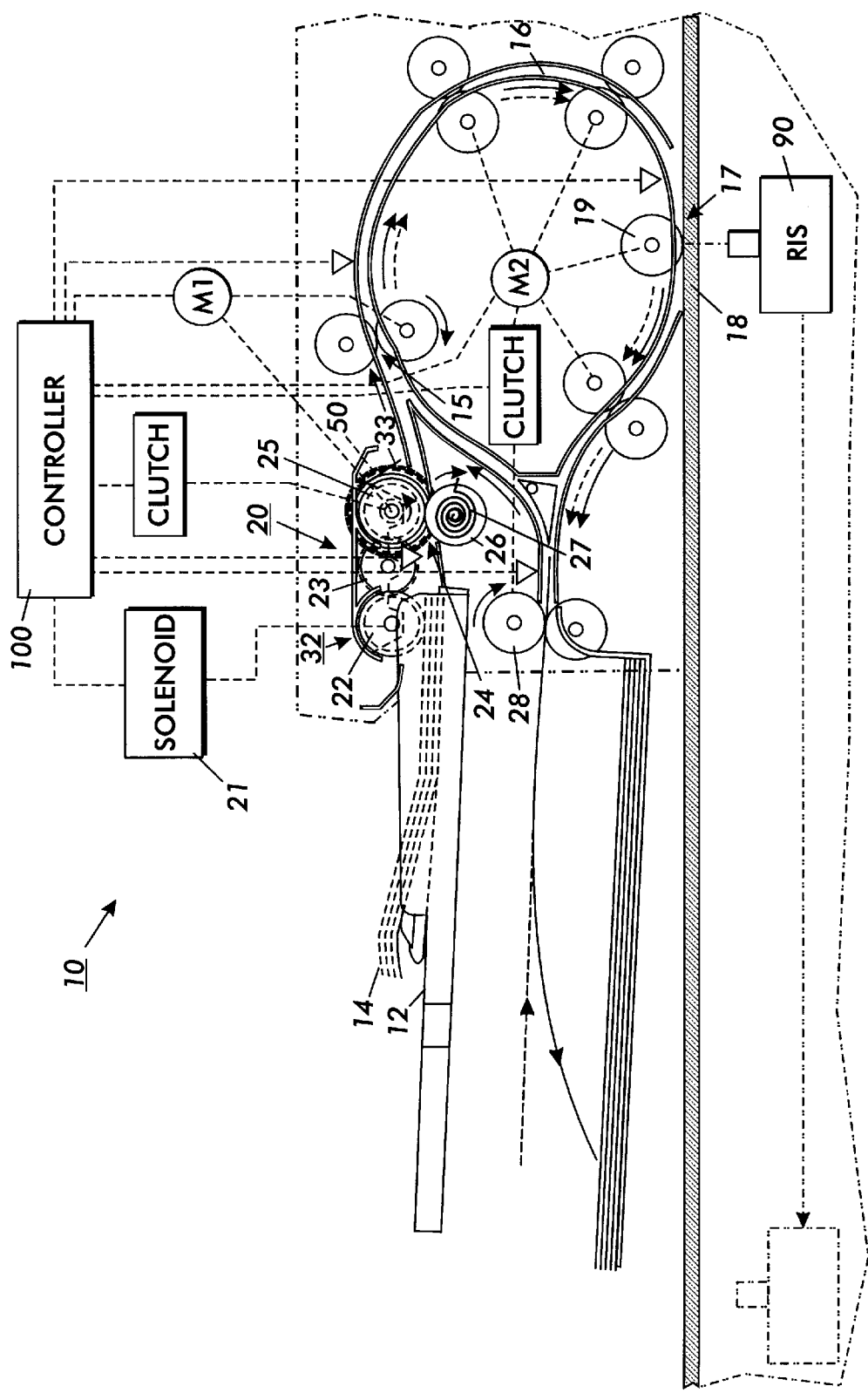
FIG. 2 (otherwise identical to FIG. 1) illustrates an alternative embodiment of the retard system wear particles attraction shield system of FIG. 1.
Figure 3:
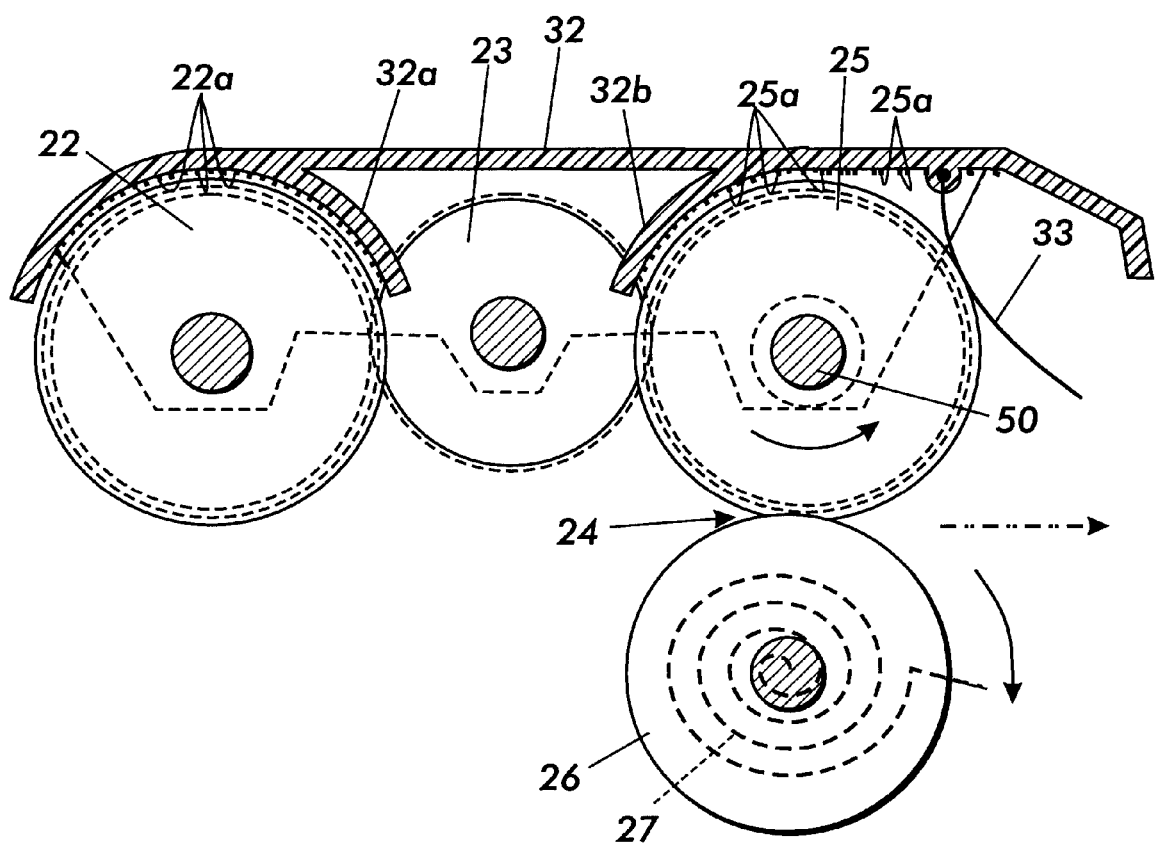
FIG. 3 is an enlarged and partly cross-sectional view of the retard separator/feeder and its electrostatic contaminant attractive shield embodiment of FIG. 2, and additionally illustrates an electrostatic charge enhancing dielectric engaging flap as an additional optional feature.
Figure 4:
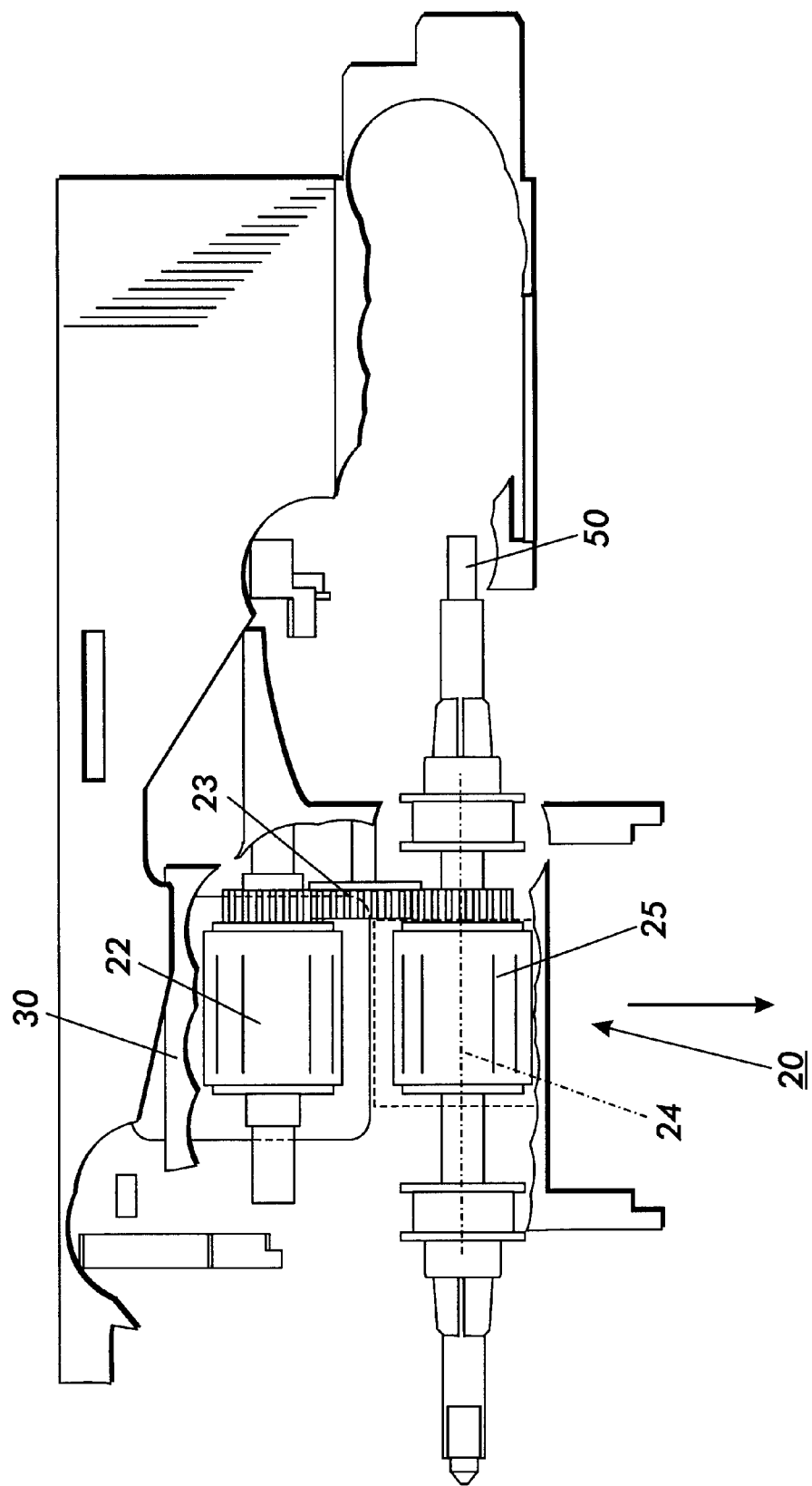
FIG. 4 is a partially broken away top view of the embodiment of FIG. 1.

The embodiment of FIGS. 1 and 4 versus the embodiment of FIGS. 2 and 3 here differ only in difference between the elastomeric wear material attractive shield 30 of the former versus the shield 32 of the latter. Both of the shields 30 and 32 closely partially surround the feed roller 25, as shown, which is the part of the retard system 20 which is engaging the image side of the document sheet—the side being imaged, i.e. the side which will be engaging the surface of the platen glass 18 at the imaging station 17. Both of the shields 30 and 32 here also optionally extend to closely partially surround the nudger roll 22, as shown, to attract thereto wear particles 22a as shown in FIG. 3.

Referring to the FIG. 3 enlarged view of the alternative shield 32, it may be seen that this shield 32 differs in adding further extending closely encircling or enclosing shield extensions 32a and 32b. Also, a "Mylar™", acetate, or other suitable flexible plastic flap 33 is flexibly engaged against the surface of the feed roller 25, at a position out of the document feed path. This adds triboelectric charging to help further electrostatic charge attraction of wear particles such as 25a to the closely adjacent inner surface of shield 32, as discussed above. Wear particles 26a from the retard roller 26 may also be acquired by their transfer to the surface of feed roller 25 when no document is present in the retard nip 24 and then to the shield 32. The feed roller 25 and the retard roller 26 may be EPDM or other commonly known rubbers used for sheet feed wheels. The material of the shields 30 or 32 may be selected from various plastics commonly used for such molded piece parts, e.g., a polycarbonate.

As shown in FIG. 3, where, as in both embodiments, the elastomeric document image surface engaging retard member surface is the surface of the rotatably driven frictional elastomeric surfaced sheet feeding roller 25, which roller 25 is generally cylindrical, the shield member 32 interior surface facing the roller 25 may be correspondingly cylindrical and closely surrounding by more than 90 degrees the elastomeric outer cylindrical surface of the feed roller 25, spaced by only a few millimeters therefrom, which is only a small fraction of the radius of the roller 25.

While the embodiments disclosed herein are preferred, it will be appreciated from this teaching that various alternatives, modifications, variations or improvements therein may be made by those skilled in the art, which are intended to be encompassed by the following claims. For example, frictional elastomer belts may be usable in lieu of one or of the above-described rollers.

What is claimed is:

1. In a moving documents imaging system in which the documents are separated and sequentially fed from a stack thereof to an imaging platen subject to contamination for an image side of said documents to be imaged by a sheet retard separator-feeder system, said sheet retard separator-feeder system including a rotatably driven frictional sheet feeding member and a sheet movement resisting frictional retard member engaging said sheet feeding member to form a sheet retard nip for retarding documents other than a document being fed by said sheet feeding member, wherein said sheet feeding member and said retard member have elastomeric surfaces, and wherein one of said sheet feeding member or said retard member engages said image side of said documents to define an document image surface engaging surface, and wherein said elastomeric surfaces produce elastomeric wear particles in said separating and sequentially feeding said documents which can contaminate said imaging platen, the improvement comprising:

an electrostatically attractive shield member with an interior surface closely spaced from and closely partially surrounding said document image surface engaging surface to attract and retain said elastomeric wear particles to said interior surface of said electrostatically attractive shield member.

2. The moving documents imaging system of claim 1, wherein said sheet retard separator-feeder system further includes an elastomeric surface nudger wheel engaging said image side of said documents upstream of said sheet feeding member, and wherein said electrostatically attractive shield member is additionally closely spaced from and closely partially surrounds said elastomeric surface nudger wheel.

3. The moving documents imaging system of claim 1, further including a triboelectric charging member engaging said document image surface engaging surface.

4. The moving documents imaging system of claim 2, further including a triboelectric charging member engaging said document image surface engaging surface.

5. The moving documents imaging system of claim 2, wherein said document image surface engaging surface is said rotatably driven frictional sheet feeding member.

6. The moving documents imaging system of claim 1, wherein said elastomeric document image surface engaging retard member surface is said rotatably driven frictional sheet feeding member, and said sheet feeding member is generally cylindrical, and wherein said shield member interior surface closely conforms to and surrounds more than 90 degrees of said elastomeric surface of said sheet feeding member.

* * * * *